United States Patent [19]

Vogel et al.

[11] Patent Number: 5,220,448
[45] Date of Patent: Jun. 15, 1993

[54] BIT AND FRAME SYNCHRONIZATION UNIT FOR AN ACCESS NODE OF OPTICAL TRANSMISSION EQUIPMENT

[75] Inventors: Paul Vogel, Steffisburg; Thomas Martinson, Fribourg, both of Switzerland

[73] Assignee: Ascom Tech AG, Bern, Switzerland

[21] Appl. No.: 777,356

[22] PCT Filed: Apr. 8, 1991

[86] PCT No.: PCT/CH91/00083
§ 371 Date: Dec. 2, 1991
§ 102(e) Date: Dec. 2, 1991

[87] PCT Pub. No.: WO91/15907
PCT Pub. Date: Oct. 17, 1991

[30] Foreign Application Priority Data
Apr. 9, 1990 [CH] Switzerland ............. 01192/90

[51] Int. Cl.⁵ ................... H04B 10/14; H04J 14/08
[52] U.S. Cl. .................... 359/158; 359/139; 359/126
[58] Field of Search ............. 359/117, 135, 139, 158, 359/173, 126, 168; 375/107, 113; 370/100.1

[56] References Cited

U.S. PATENT DOCUMENTS

| | | | |
|---|---|---|---|
| 4,554,673 | 11/1985 | Stevens | 359/158 |
| 4,777,661 | 10/1988 | Spillman | 359/168 |
| 5,130,836 | 7/1992 | Kahaku | 359/158 |

FOREIGN PATENT DOCUMENTS

| | | | |
|---|---|---|---|
| 0053790 | 6/1982 | European Pat. Off. | 359/168 |
| 0287415 | 10/1988 | European Pat. Off. | 359/158 |
| 0305992 | 3/1989 | European Pat. Off. | 359/158 |
| 3744072 | 7/1989 | Fed. Rep. of Germany | 359/139 |
| 0176220 | 8/1986 | Japan | 359/168 |
| 2019561 | 10/1979 | United Kingdom | 359/126 |
| 2154091 | 8/1985 | United Kingdom | 359/117 |
| 87/06084 | 10/1987 | World Int. Prop. O. | 359/126 |

OTHER PUBLICATIONS

Noel, "Faraday-Effect Fiber Optic Switch", IBM Tech Disclosure, vol. 26, #7B Dec. 1983 pp. 3744-3745.
Viklund, "Optical Fibers in LAN's", Communications International, Oct. 1985, pp. 19-21 and 24.

Primary Examiner—Edward L. Coles, Sr.
Assistant Examiner—Leslie Pascal
Attorney, Agent, or Firm—McAulay, Fisher, Nissen, Goldberg & Kiel

[57] ABSTRACT

The bit and frame synchronization unit (51) serves for the synchronization of an access node to the bit stream running along an optical fiber.

The unit (51) comprises an optical switching element (57) which can be controlled electrically and serves as a light switch. It further comprises a sequence generator (75) for electrically controlling the switching element (57), a clock generator (72), an optoelectrical transducer (60), an electrical integrator (63), a regulator and evaluator (66) and a control unit (69). In addition, there is a coarse regulator (48).

An optical bit pattern (BM) occurs periodically at the input (53), an equivalent electrical comparison pattern (VM) assigned to the latter occurs at the control input (44). The level of the resultant electrical voltage pulse U at the output (64) of the integrator (63) is a measurement for the respective relative phase deviation during approximate synchronous running. There is a sharp pulse maximum during absolute synchronous running.

The unit (51) serves for the simultaneous synchronization of the bit and frame clock.

9 Claims, 6 Drawing Sheets

BIT AND FRAME SYNCHRONIZATION UNIT FOR AN ACCESS NODE OF OPTICAL TRANSMISSION EQUIPMENT

BACKGROUND OF THE INVENTION

1. Field of the Invention

The invention is directed to a bit and frame synchronization unit for an access node of optical transmission equipment.

2. Description of the Prior Art

Transmission equipment and diverse types of information transmission via transmission lines are known in general. Recently, optical transmission lines have become increasingly important for various reasons. In addition to the optical point-to-point connections, complicated network structures with optical lines are also known. For example, in an article entitled "Optical fibres in local area networks", Communications/Communications International, October 1985, pages 19 ff., B. Viklund describes various network structures with glass fiber cables for distribution networks and for networks with connections between diverse subscribers which can be set up individually. In the latter, a ring structure is most favorable. The subscriber stations of an optical transmission line of the aforementioned type are connected to the respective utilized fibers via optoelectrical couplers.

At present, there are components for optical systems, e.g. couplers, switches and modulators, based e.g. on InP semiconductor material, which utilize electro-optical effects in order to influence light. These elements work up to frequencies in the gigahertz range.

The use of address-coded packets for the transmission of information is generally known. Such packets comprise a header and an information part [hereinafter, infopart], wherein the header contains all necessary data for the respective packet and the participating devices, e.g. a destination or target address, data concerning the type of packet, monitoring bits, etc. The infopart is available for the useful information to be transmitted.

When receiving information arriving via an optical line, it is unavoidable that at least a part of the light stream carrying the information is used. Further, every receiving subscriber station must be synchronized to the bit clock and to the clock of the passing packet.

SUMMARY OF THE INVENTION

The object of the invention consists in providing transmission equipment which makes do to a great extent without electrical regenerators while utilizing the aforementioned components. In particular, a bit and frame synchronization unit is to be provided which is simple in construction and operates in an uncomplicated manner.

The solution, according to the invention, makes it possible to provide flexible transmission equipment which has considerable advantages over the comparable, previously known equipment because of its more extensive optical construction. An outstanding immunity to electromagnetic interference should be noted in particular. The synchronization unit works with an integrator which is slow compared to the bit clock and by nature has no problematical reactions to distortions and the like. The synchronization unit is accordingly suitable for rapid transmission lines up to clock frequencies of e.g. several gigabits. Moreover, it is advantageous that the synchronization to the bit clock and frame clock is effected mutually and simultaneously.

The invention is described in more detail in the following by way of example with reference to seven diagrams.

DESCRIPTION OF THE PREFERRED EMBODIMENTS

Figure 1:
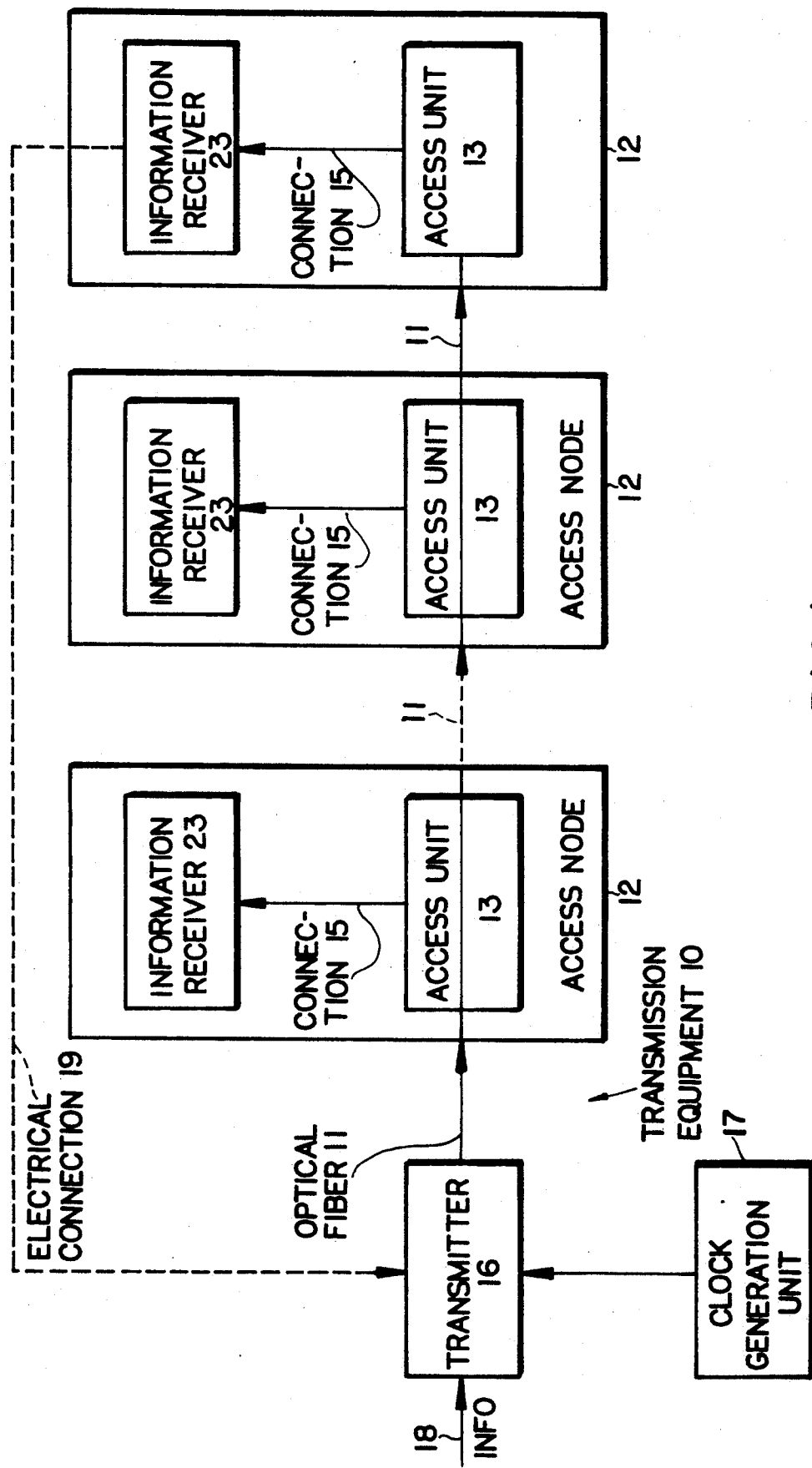
FIG. 1 is a schematic view of optical transmission equipment.

FIG. 1 shows a schematic view of transmission equipment 10 on which information is transmitted in the direction of the arrow in the form of addressed packets. An optical fiber 11, particularly a monomode fiber, serves as transmission medium. A plurality of access nodes 12 are incorporated in series in this fiber 11, so that the fiber 11 is divided into portions, but the light stream, as a whole, is not interrupted. An address is assigned to each access node 12 by which it is distinguished from all other nodes. However, it is also possible for the same address to be assigned to a plurality of nodes 12.

The light stream commences in a transmitter 16, particularly a semiconductor laser, which feeds a substantially continuous constant light stream into the entry portion of the fiber 11, and an associated modulator for modulating this constant light stream. The modulated light stream passes through the fiber 11 and, in so doing, passes continuously through all access nodes 12. These nodes comprise access units 13 which do not interrupt the light stream, as has been described. By means of these access units 13, every node 12 is capable of reading the information contained in the light stream. At times, this information can be useful information contained in the packets. At other times, this information can consist of addresses, data concerning the packets, synchronization signals, etc. The information receivers 23, which are connected via connections 15 with the access units 13, serve to receive and evaluate the information.

It is advantageous if the modulation of the light stream is selected in such a way that existing light or high light power or high light intensity or brightness, respectively, represents the logical 1 state and nonexisting light or low light power or low light intensity or darkness represents the logical 0 state.

The bit clock of the light stream and the packets originate in the transmitter 16 in that its modulator is controlled by means of a clock generation unit 17 and as a function of the information to be transmitted, which is indicated as a bar arrow 18. Instead of packets, the light stream can also be organized by frames.

The optical fiber 11 can be arranged circularly and the receiver 23 of the last access node 12 can be connected with the transmitter 16 e.g. by means of a short electrical connection 19. Accordingly, a ring-shaped arrangement is formed in which the transmitter 16 contains the only light source. But the receiver 23 of the last access node 12 can also be electrically connected with the transmitter 16 of other transmission equipment 10, so that a doubling of the linear dimension is achieved. In such equipment, active transmitters 16 equipped with a light transmitter alternate with passive nodes 12 containing no light transmitter.

Figure 2:
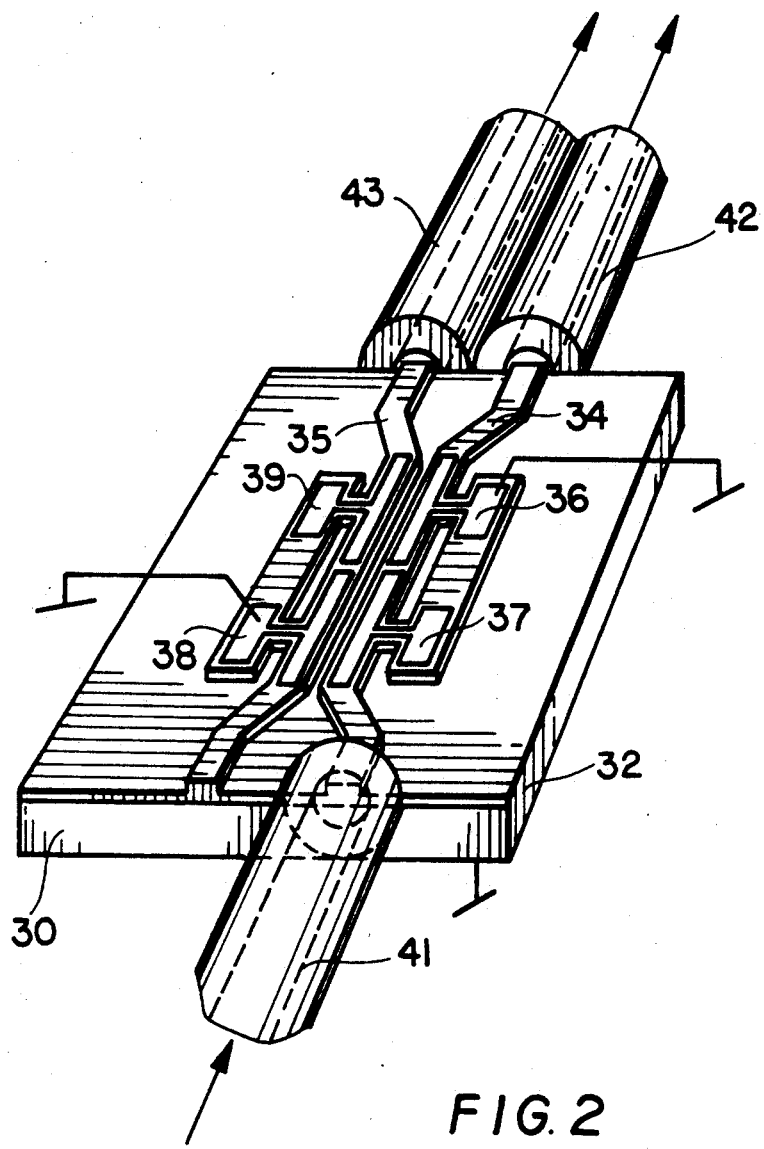
FIG. 2 is a schematic view of an optical directional coupler on a very enlarged scale.

FIG. 2 shows a schematic, greatly enlarged view of an integrated optical directional coupler 30 as the core of the aforementioned access units 13. The directional coupler 30 comprises two adjacent optical rib waveguides 34, 35 on a semiconductor substrate 32, e.g. an InP substrate, which rib waveguides 34, 35 are covered by a total of four metallic control electrodes 36 to 39, electrical control voltage can be applied via the latter. The directional coupler is connected on its input side to an incoming fiber, particularly a monomode fiber 41, by one rib waveguide 34. It is connected on its output side to an outgoing fiber 42 and 43, respectively, by both rib waveguides 34, 35.

Figure 3:
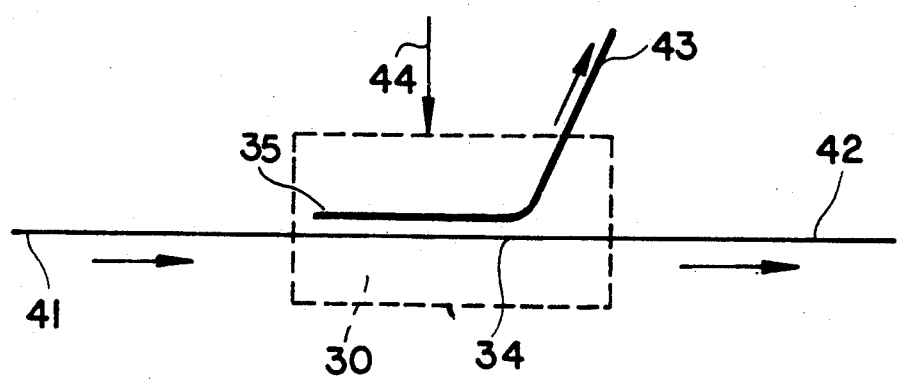
FIG. 3 is a symbolic depiction of the directional coupler.

The described example of the directional coupler 30 works as a light switch, wherein the light stream arriving via the fiber 41 can be divided in any desired ratio on the two outgoing fibers 42, 43 as a function of the voltages applied to the control electrodes 36 to 39. FIG. 3 is a symbolic representation of the directional coupler 30 for the purpose of expressing the switching function. The arrow 44 symbolizes the electrical control possibility which is provided by means of the control electrodes 36 to 39 (FIG. 2).

If the directional coupler 30 is completely switched through, then two "digital" switching positions result, namely one in which the light path from the input of the coupler to the respective output permits a light stream to pass and a second in which this path is blocked.

Figure 4:
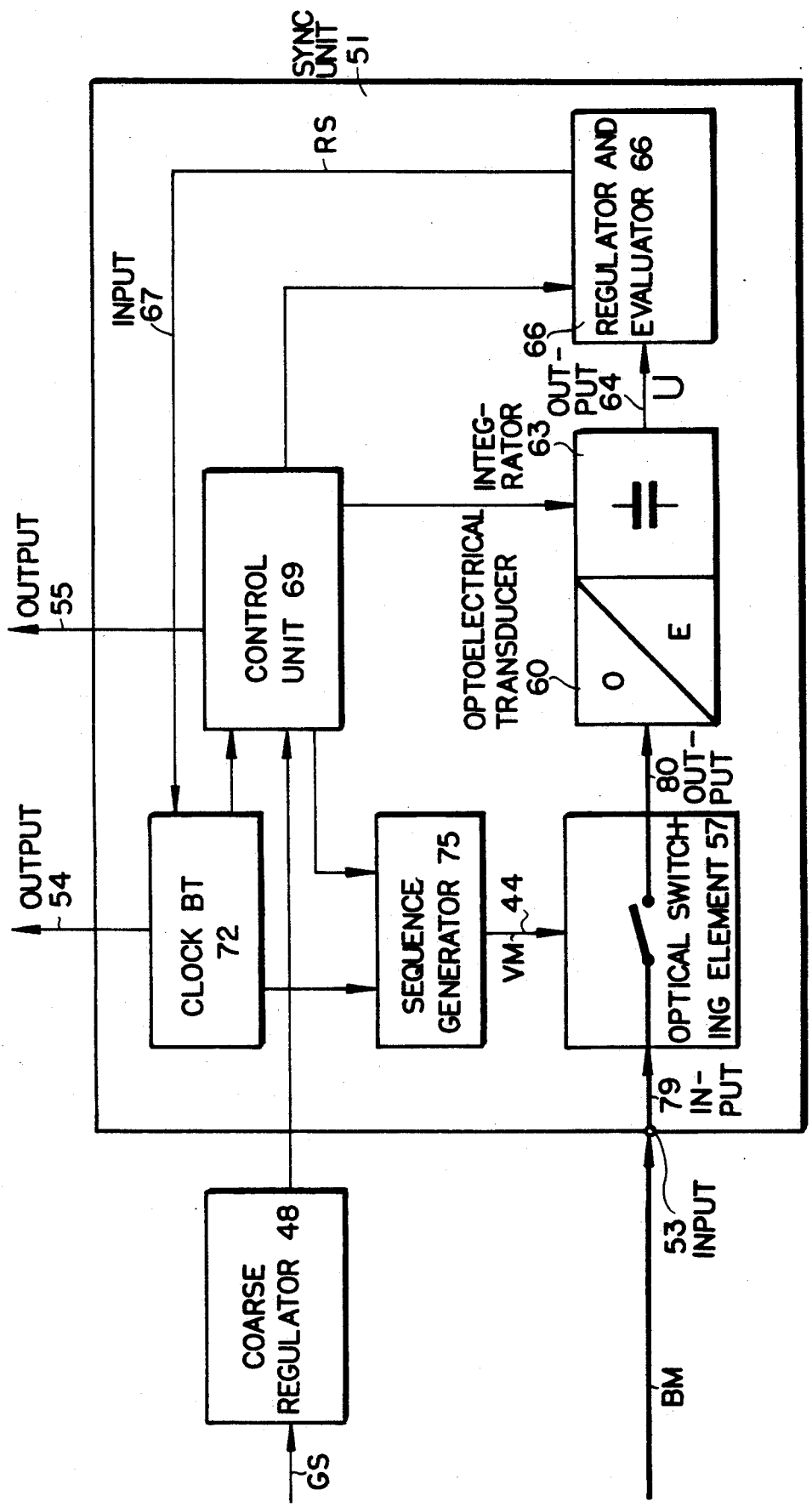
FIG. 4 is a block wiring diagram of a first bit and frame synchronization unit.

FIG. 4 shows a block wiring diagram of a bit and frame synchronization unit 51. The latter serves the purpose of synchronizing to the light stream of the fiber 11 in every access node 12, specifically to the bit clock and to the packet or frame clock simultaneously. The bit and frame synchronization unit 51, hereinafter sync unit, comprises an optical input 53 which corresponds to the connection 15 of FIG. 1 and two electrical outputs 54, 55. In the drawing, the electrical connections are shown as simple arrows and the optical connections are shown as bar arrows.

The sync unit 51 comprises an optical switching element 57 which can be controlled electrically, an optical transducer 60, an integrator 63, a regulator and evaluator 66, a control unit 69, a clock generator 72, and a sequence generator 75. In addition to this, there is a coarse regulator 48.

The clock generator 72 is connected with the control unit 69, the regulator and evaluator 66 and the sequence generator 75. The latter (75) is connected with the switching element 57 and the control unit 69 is connected with the sequence generator 75, the integrator 63 and the regulator and evaluator 66. The coarse regulator 48 is connected with the control unit 69, and the outputs 54 and 55 are connected with the clock generator 72 and the control unit 69, respectively.

The clock generator 72 sends a bit clock to its outputs which always corresponds approximately to the (known) bit clock BT of the clock generator unit 17 and accordingly to the clock on the fiber 11. It receives a regulating signal RS from the regulator and evaluator 66 via its input 67, by means of which regulating signal RS it adjusts itself exactly to the respective bit clock BT of the fiber 11 exposed to possible fluctuations. This clock BT is sent via all outputs of the clock generator 72, particularly also via the output 54 of the sync unit 51.

The sequence generator 75 transmits a serial, electrical comparison pattern VM to the switching element 57 in the bit clock BT of the clock generator 72, wherein this process is controlled by means of the control unit 69 and the coarse regulator 48. The comparison pattern VM comprises a sequence of e.g. twenty to thirty bits, i.e. the values logical 0 and 1, e.g. the sequence 111001001110100001111100000111. An optical bit pattern BM which appears regularly on the fiber 11 as a synchronization signal proceeding from the transmitter 16 corresponds completely to this comparison pattern VM.

The optical switching element 57 is constructed as a directional coupler 30, wherein the latter either unblocks or blocks the optical path between its input 79 and its single output 80, as controlled by its control input 44.

Alternatively, the optical switching element 57 can be constructed as any desired element which fulfills the described functions. Such elements are e.g. controllable optical amplifiers, optical modulators, controlled mirrors etc.

The optoelectrical transducer 60 is preferably a rapid photodiode with a suitable amplifier connected subsequent to it. In this case, the output capacitance of the diode, together with the amplifier, which is coupled to the diode in a spatially close manner, form the integrator 63. The "virtual" magnitude of the integrator, its RC time and other parameters, can be influenced by the manner in which the circuitry of the amplifier is constructed. The integrator 63 transmits voltage pulses U at its output whose levels form a measurement for a respective integral.

The regulator and evaluator 66 is a unit which forms a regulating signal RS from a plurality of input signals U, e.g. by comparing the respective consecutive signals, and transmits it to the connection 67. This regulating signal RS can be e.g. a constant voltage which is fed to a VCO (voltage controlled oscillator) in the clock generator 72 for the purpose of varying the bit clock BT of the clock generator 72.

The sync unit 51 operates as follows: The coarse regulator 48, to be described in the following, releases the work of the sync unit 51 by means of a signal to the control unit 69. The bit pattern BM which is branched from the fiber 11 is fed into the sync unit 51 via the input 53 and reaches the switching element 57. The electrical comparison pattern VM is now applied to the latter proceeding from the clock generator 72, the control unit 69 and the sequence generator 75 so as to conform as closely as possible with respect to the phase and clock. The switching element 57 switches the light or, more exactly, the brightness/darkness sequence of the optical bit pattern BT, through to the optoelectrical transducer 60 in a bit-by-bit manner and as a function of the logical importance of the respective bit of the comparison pattern VM or blocks the optical path by means of the switching element 57.

The optoelectrical transducer 60 receives the light permitted to flow through by the switching element 57 and converts this light into an electrical charge e in proportion to its respective light power or light quantity. This charge e forms an electrical voltage of value U in the integrator 63 which electrical voltage is totally dependent on the patterns BM, VM and their relative phase position. The regulator and evaluator 66 evaluates this respective voltage U and transmits the aforementioned regulating signal RS to the connection 67. The clock generator 72 adapts its respective bit clock BT, as well as the phase position relative to the next bit pattern BM, to this regulating signal RS.

The sync unit 51 forms a control loop in the described manner. The control unit 69 ensures that the integrator 63 and the regulator and evaluator 66 are actively switched and then returned to the respective rest position ("clear" function) at the correct time, i.e. only for the duration of the bit pattern BM.

If the optical bit pattern BM and the electrical comparison pattern VM appear at the respective inputs of the switching element 57 at the identical phase and clock, i.e. if there is exact synchronism, then a state known in a correlator as autocorrelation occurs in practice. This means the voltage U reaches an extreme value, either a maximum value Umax because all light is allowed through, or a minimum value Umin because all light is blocked, i.e. zero light quantity. The logical value, 1 or 0, assigned to the states, light or no light, at the input 53 of the switching element 57 determines which of these extreme values is reached. It is assumed in the following that the extreme value is a maximum value Umax.

The case of exact agreement between the bit pattern BM and the comparison pattern VM mentioned above is the desired case in which both the bit clock BT and the frame or packet clock RT are completely synchronized. In this case, the bit clock BT appears at the output 54 for controlling additional units, not shown, of the respective access node 12 and at the output 55 of the frame clock RT.

Figure 5:
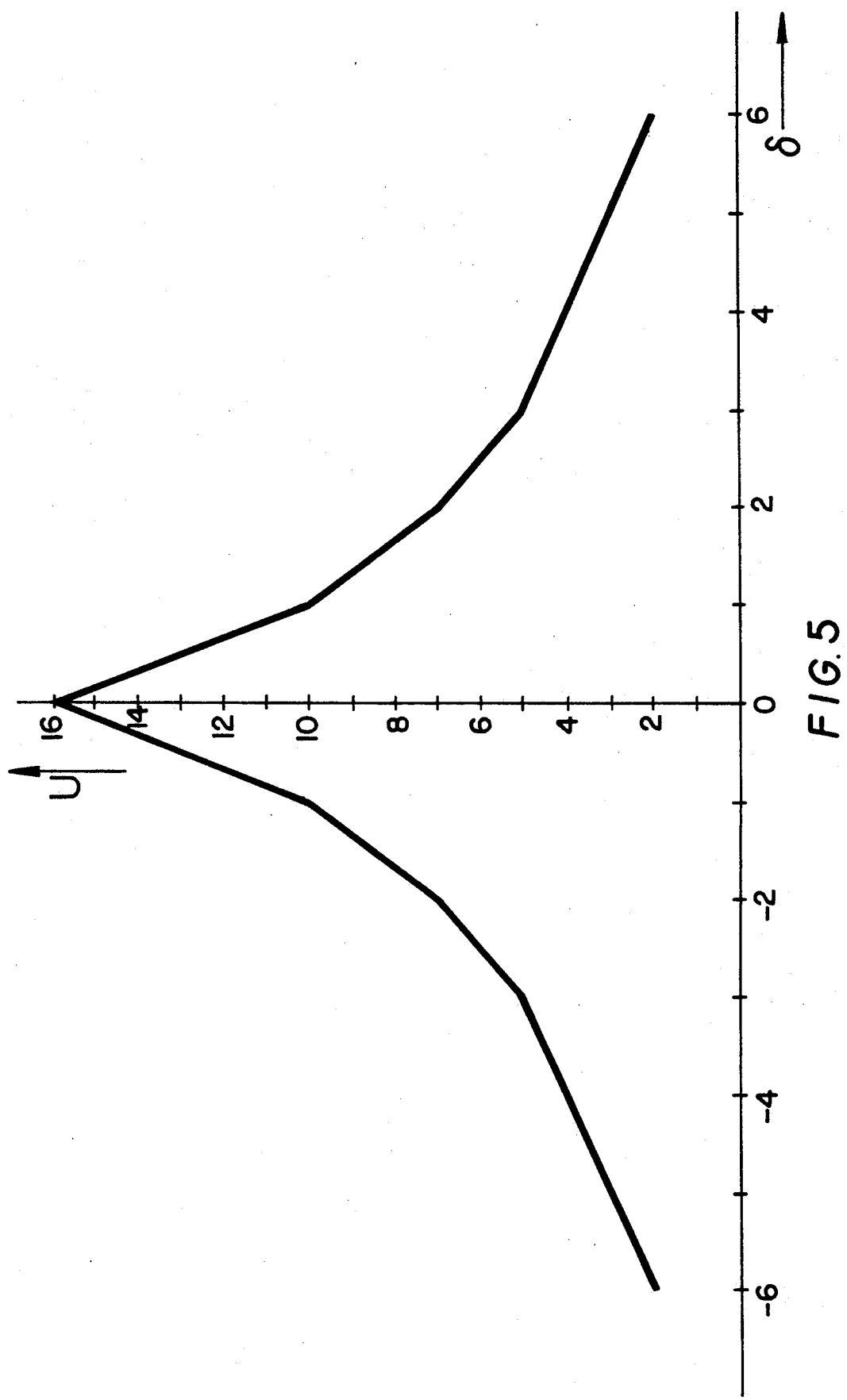
FIG. 5 shows assigned functional dependency.

FIG. 5 shows the theoretical dependency of the respective voltage value U at the output 64 of the integrator 63 on the phase deviation δ between the bit pattern BM and the comparison pattern VM. The bit sequence of logical 00000011100100111010000111110000001111000000 serves as bit pattern BM, the aforementioned bit sequence of logical 1110010011101000011111000000111 serves as comparison pattern VM. With the exception of the six zeros at the ends, these two bit sequences are identical. Theoretical dependency means that the bit clocks BT agree exactly with respect to frequency and that there is no phase deviation of the bit clocks. Further, the integration is effected in the integrator 63 completely and without errors. The voltage U is plotted as ordinate in (desired values), the quantity δ is plotted on the abscissa as deviation from the exact synchronism in phase or displacement steps of 1 bit in each instance.

The dependency or curve of FIG. 5 has a symmetrical curve which drops "compulsorily" from maximum Umax at both sides. The maximum is sharply pronounced. The regulator and evaluator 66 can therefore produce regulating and evaluating signals in a simple manner which guide the sync unit 51 in the direction of maximum output voltage values U at all times. If the maximum is reached, this signifies optimal bit synchronization and optimal frame synchronization simultaneously. This is the desired exact synchronism.

The method of maximum search is known as such and is based on the comparison of two or more consecutive or corresponding measurements of U. The sequence and levels of U indicate the flank of the curve of FIG. 5 at which the measurement values lie. Accordingly, a measurement value is formed for the direction in which the maximum lies. The forced flanks and the sharp maximum are suitable particularly for regulating processes by means of which even slight deviations from the synchronous running of the bit and frame clocks BT and RT, respectively, can be very quickly detected and canceled or leveled.

Figure 6:
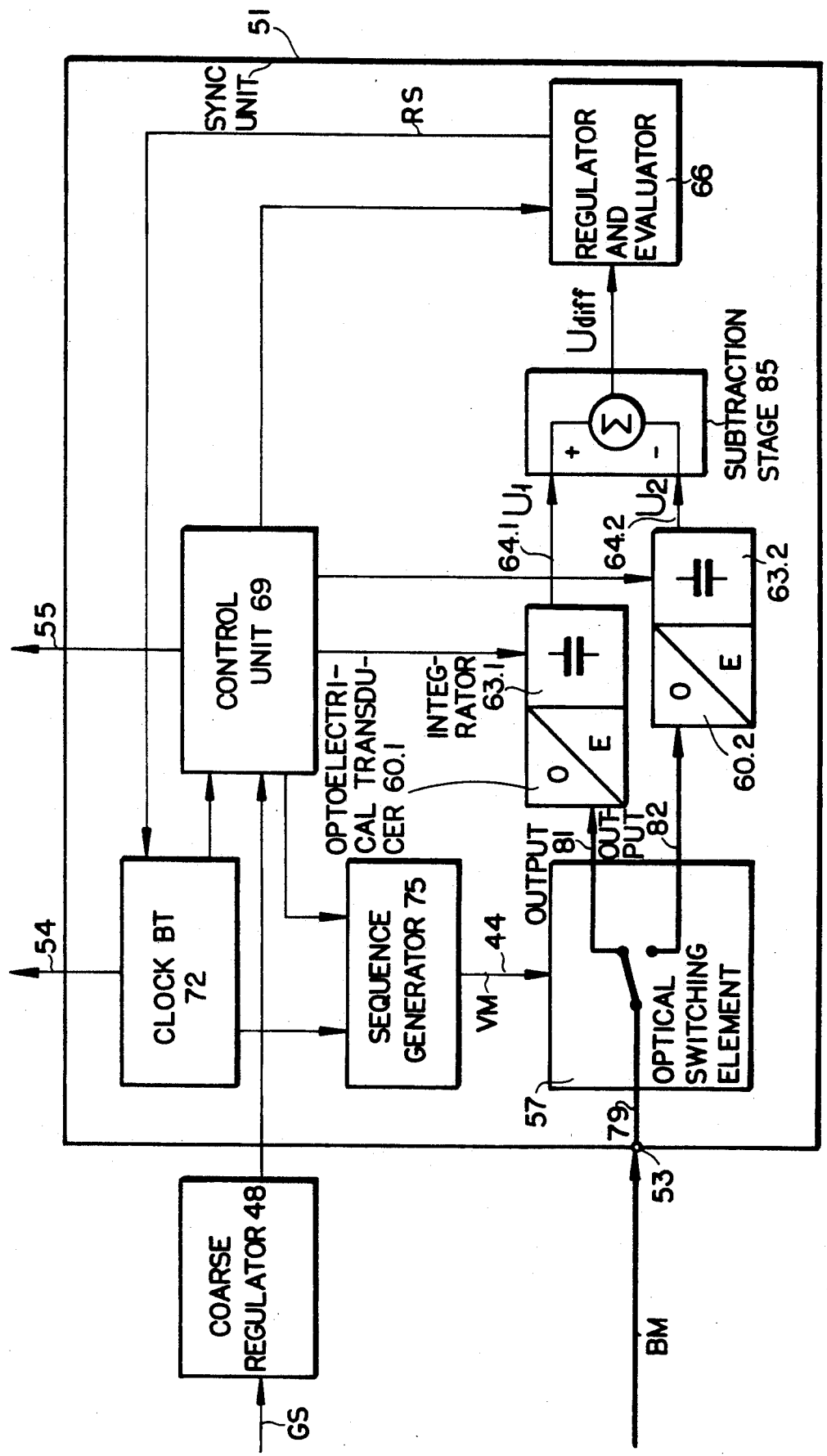
FIG. 6 is a block wiring diagram of a second bit and frame synchronization unit.

FIG. 6 shows the block wiring diagram for a second, somewhat modified sync unit 51. In the latter, the switching element 57 forms an optical reversing switch whose input 53 and two outputs 81, 82 are optically connected with one another, as desired, by means of the control unit 69 and the sequence generator 75. Two identical optoelectrical transducers 60.1, 60.2 and assigned integrators 63.1, 63.2 are connected subsequent to the outputs 81, 82. A subtraction stage 85 which forms the differential Udiff from the two output voltages U1, U2 of the integrators 63.1, 63.2 is connected to the outputs 64.1, 64.2.. This differential Udiff is fed to the regulator and evaluator 66.

The unit which in other respects is identical to the sync unit of FIG. 4 works in a similar manner. The difference consists in that a sharper maximum of the assigned theoretical dependency of the voltage U on the phase deviation δ results due to the controlled optical switching to the two outputs 81, 82 and due to the differentiation in the subtracting stage 85. Further, there is an improved response during the occurrence of noise, which is always unavoidable.

Figure 7:
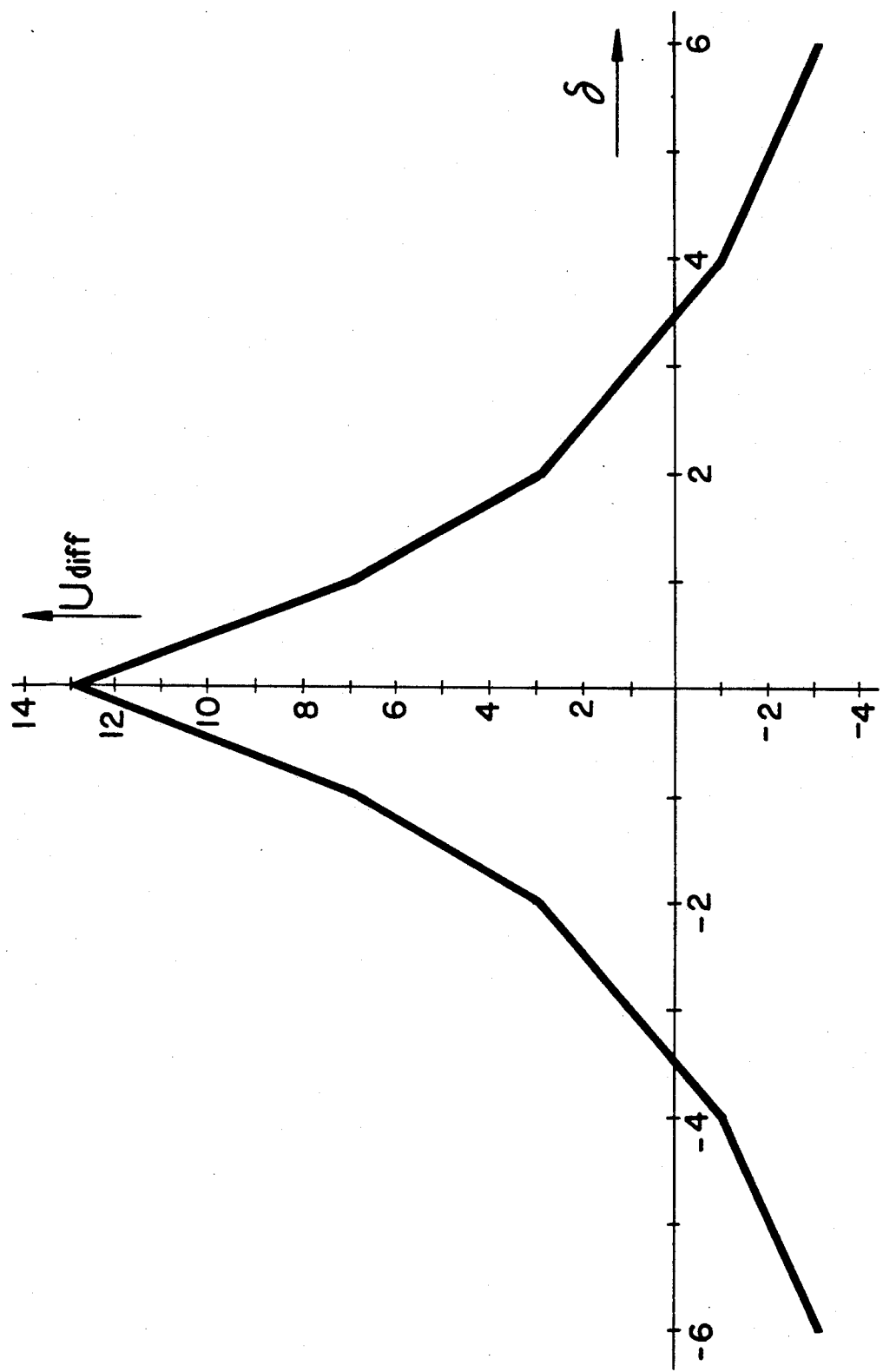
FIG. 7 shows the functional dependency of the second bit and frame synchronization unit.

FIG. 7 shows the aforementioned dependency assigned to the sync unit 51 according to FIG. 6. The sequence of logical 0000000000111111110000111011000000000 serves as bit pattern BM (as example), and the sequence 000011111111100001110110000 serves as comparison pattern VM. Although these sequences are clearly shorter than the sequences described with reference to FIG. 5, the curve, which is again symmetrical, has a sharper maximum with clearly lower lateral flanks, wherein these flanks are again concave as seen from above.

A sync unit 51 of the described type only works in a faultless and rapid manner when there is at least a certain overlapping between the bit pattern BM and the comparison pattern VM. The coarse regulator 48 serves to bring about this minimum overlapping. The latter responds to coarse synchronization signals GS which are transmitted regularly, particularly periodically, from the clock generator unit 17 to the fiber 11. E.g. a short sequence with an oscillation whose frequency is twice or three times as high as the base frequency of a (normal) logical sequence 010101... is suitable as coarse synchronization signal. Such a sequence can easily be detected by means of the coarse regulator with the aid of a filter and can be filtered out of the general bit stream.

In another construction, the coarse regulator 48 can also be arranged in such a way that it searches the successive frames or packets for the position of the respective bit pattern BM and changes its phase relation δ relative to the frames in a stepwise manner from frame to frame until it discovers the bit pattern BM.

The following are mentioned in addition to the variations already mentioned: The sequence generator 75 can be constructed in such a way that it contains the respective comparison pattern VM in storage and transmits this comparison pattern VM so as to be controlled by means of the control unit 69 and in the clock of the clock generator 72. Instead of this, it can generate it again by means of a suitable algorithm or receive the comparison pattern VM from a unit, not shown, and transmit it to the optical switching element 57.

In its simplest construction, the regulator and evaluator 66 can comprise a simple threshold circuit, e.g. a monostable multivibrator. However, a more expensive circuit which can compare and evaluate a plurality of voltage values U, e.g. values occurring successively with respect to time or simultaneous values occurring parallel to one another, is recommended for a quicker search for the correlation maximum.

The described sync unit 51 works with very low light powers and is substantially more robust in relation to disturbances, noise and the required quality of the light bits than a comparable, purely electronically operating unit. This is based primarily on the balancing function of the integrator 63 which is based on analog technology and not on digital technology. Accordingly, there is a reduction of the required working speed by at least a factor of 4 to 10 at a decisive place in the arrangement.

The aforementioned bit pattern BM and comparison pattern VM serving as examples can be replaced by other patterns or sequences. The number of required bits, i.e. the length of the patterns, forms an important criterion for their advantages. The bit pattern BM and comparison VM should be identical up to their edges, as was described. However, it is also possible for them to differ from one another slightly, e.g. generally or as a result of jitter effects or the like.

The bit patterns BM can be contained in every packet, particularly in its header. However, they can also be transmitted less frequently on the fiber 11, e.g. as the contents of a special packet type which is reserved for special tasks and e.g. appears after every hundred normal packets.

The access nodes 12 can be connected to a through-going fiber 11 as described. However, it is also possible to insert the sync unit 51 in other nodes, e.g. those regenerating the light stream electrically.

The integrator 63 can be designed differently using electronic means, particularly sensitive and quick input amplifiers. In so doing, the electrical charge e which is released in the optoelectrical transducer 60 forms the aforementioned voltage U so as to integrate in the resultant input capacitance of the amplifier.

What is claimed is:

1. Equipment for optical transmission of information comprising:
   a light source for producing a light beam, said light beam carrying information in the form of a bit pattern having bright and dark bits, the length of the bit pattern defining the bit clock of said beam;
   an optical fiber connected to said source for transporting said beam;
   a plurality of access nodes, serially connected to said optical fiber;
   a frame clock for synchronizing said access nodes using a synchronization code;
   wherein each of said access nodes comprises a bit and a frame synchronization unit, said bit and frame synchronization unit comprising:
   an optical switching element having an optical input, an optical output and an electrical control input;
   an electrical sequence generator having a control input and a sequence output, said sequence output being connected to said electrical control input and transporting a comparison pattern;
   an optoelectrical transducer connected to said optical output;
   an integrator having a control input connected to said optoelectrical transducer;
   an electrical regulator and evaluator having a control input connected to said integrator; and
   a control unit connected to said control inputs of said sequence generator, said integrator and said regulator and evaluator.

2. The equipment for optical transmission of information according to claim 1, wherein said switching element is constructed as an optical on/off switch with a single output.

3. The equipment for optical transmission of information according to claim 1, wherein said switching element is constructed as an optical reverse switch with two outputs, and wherein a subtraction stage is connected between two integrators and said regulator and evaluator for forming a voltage differential signal.

4. The equipment for optical transmission of information according to claim 1, wherein said optoelectrical transducer comprises a photodiode having an output capacitance, and a subsequently arranged amplifier having an input capacitance, said photodiode and said subsequently arranged amplifier forming said integrator.

5. The equipment for optical transmission of information according to claim 1, wherein said control unit controls said sequence generator so that said sequence generator transmits a comparison pattern in constant optimal synchronization at the same time as said bit pattern arrives at said switching element.

6. The equipment for optical transmission of information according to claim 1, wherein a coarse regulator is provided for producing a coarse synchronization between said bit pattern and said comparison pattern and for transmitting an assigned signal to said control unit.

7. The equipment for optical transmission of information according to claim 1, wherein a coarse regulator is constructed for responding to a bit sequence having a frequency, said frequency being at least twice as high as a base frequency of a sequence of bits whose value alternates between logical zero and one.

8. The equipment for optical transmission of information according to claim 1, wherein a coarse regulator is constructed for the stepwise search of successive frames, and wherein the phase relation between said bit pattern and said comparison pattern is varied from step to step.

9. The equipment for optical transmission of information according to claim 1, wherein said bit pattern and said comparison pattern are constructed in such a way that the functional dependency of the level of the resultant voltage values on the phase deviation between said bit pattern and said comparison pattern has forced flanks which are concave from the maximum.

* * * * *